UNITED STATES PATENT OFFICE.

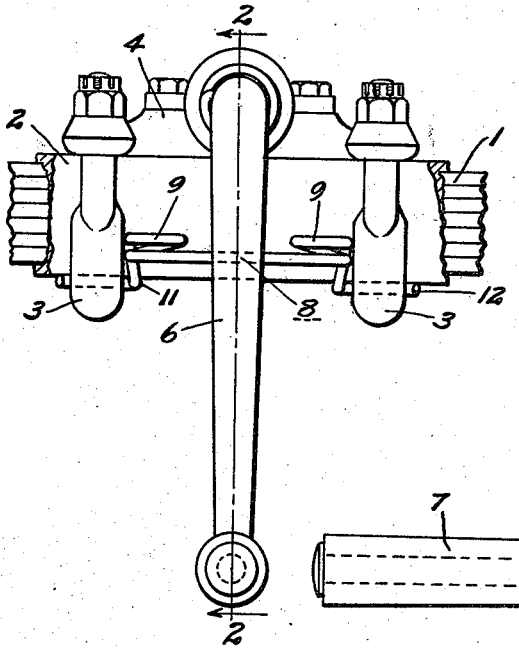
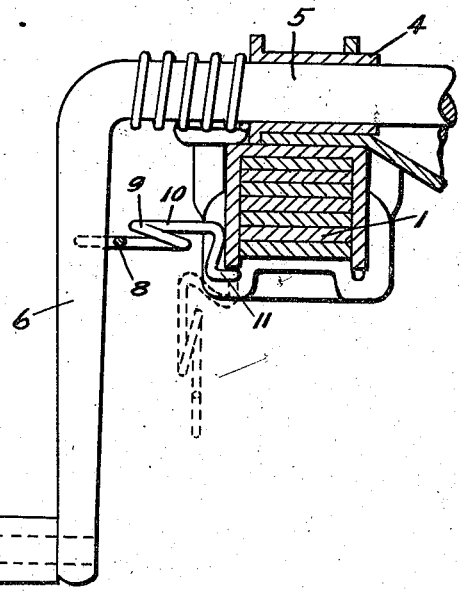
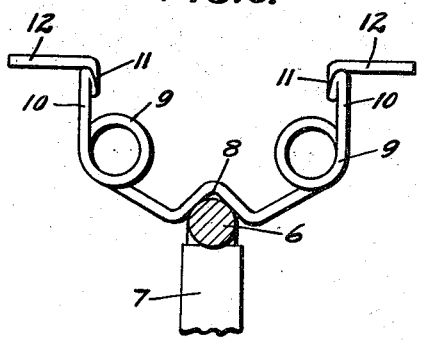
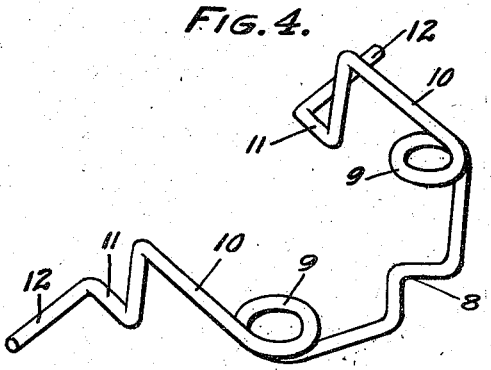

MARTIN THU, OF BAKERSFIELD, CALIFORNIA.

CRANK HOLDER.

1,421,860.  Specification of Letters Patent.  Patented July 4, 1922.

Application filed March 2, 1921. Serial No. 449,140.

*To all whom it may concern:*

Be it known that I, MARTIN THU, a citizen of the United States, residing at Bakersfield, in the county of Kern and State of California, have invented new and useful Improvements in Crank Holders, of which the following is a specification.

It is the object of this invention to provide a crank holder particularly adapted to be employed as a holder for the starting crank of an automobile.

The improved holder will prevent the starting crank from swinging and rattling when the automobile is in motion and will thus prevent unnecessary wear as well as eliminating disagreeable noises.

The improved holder also provides a simple construction which may be readily placed in position and which forms a device conveniently moved into operative position and as readily swung out of the way when it is desired to turn the crank for starting the automobile.

The invention will be readily understood from the following description of the accompanying drawings, in which—

Figure 1 is a front elevation of the starting crank and associated parts of an automobile showing the improved crank holder in operative position.

Fig. 2 is a transverse section on the line 2—2 of Fig. 1 showing the crank holder in inoperative position in dotted lines.

Fig. 3 is a plan view of the crank holder showing the method of engaging a crank.

Fig. 4 is a perspective view of the holder.

In the drawings I have shown the usual front transverse spring of an automobile at 1, said spring being carried within a channel iron 2 having the clips 3 bolted thereto for retaining the spring in said channel. A bearing 4 for crank 5 is positioned in usual manner above spring 1 with the crank arm 6 extending downwardly in front of the spring and terminating in a usual handle 7.

The improved crank holder comprises a resilient member, preferably a single piece of round wire, and forming a notch 8 intermediate of its ends adapted to receive crank arm 6. Beyond notch 8, the respective ends of the wire are preferably coiled as shown at 9 in order to impart additional resiliency to the holder. The ends of the wire then extend rearwardly as shown at 10 and terminate in downwardly offset portions 11 having angularly disposed ends 12.

The ends 12 are journaled with relation to the frame of the automobile as by receiving the same in the spaces formed between the edge of channel iron 2 and the clips 3. By this arrangement the crank holder may be either swung upwardly to operative position, as shown in full lines in Fig. 2 and wherein crank arms 6 will be received in notch 8, or may be swung downwardly to the position shown in dotted lines in Fig. 2 and wherein the holder is disengaged from the crank for permitting of rotation of the latter.

It will be noted that due to the offset portions 11 of the crank holder, that the pivotal mountings provided for the latter by the ends 12 are below the point of contact between the resilient clip forming the holder and the crank when the holder is in operative position. As a consequence the holder is prevented from working itself downwardly and loose from the crank.

It will thus be seen that I have provided extremely simple but efficient means for retaining a starting crank in position and one which may be readily moved into either operative or inoperative position.

Various changes may be made without departing from the spirit of the invention as claimed.

What is claimed is:

A crank holder comprising a wire having a central portion bent to form a notch adapted to receive a crank arm, second portions extending outwardly and backwardly from the central portion, said second portions being coiled, third portions extending backwardly from the second portions, fourth portions extending downwardly from the third portions, fifth portions extending backwardly from the fourth portions, and sixth portions extending outwardly from the fifth portions, the sixth portions forming pintles adapted to be mounted in the clips engaging the front spring of an automobile so that the holder may swing up and down into and out of engagement with the crank arm.

In testimony whereof I have signed my name to this specification.

MARTIN THU.